(12) United States Patent
Mackin

(10) Patent No.: US 10,208,675 B2
(45) Date of Patent: Feb. 19, 2019

(54) HYBRID DRIVE SYSTEM FOR TRANSFERRING POWER FROM A GAS TURBINE ENGINE OF AN AIRCRAFT

(71) Applicant: The Boeing Company, Chicago, IL (US)

(72) Inventor: Steve Mackin, Bellevue, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/459,765

(22) Filed: Mar. 15, 2017

(65) Prior Publication Data
US 2018/0266329 A1     Sep. 20, 2018

(51) Int. Cl.
| | |
|---|---|
| *F02C 7/36* | (2006.01) |
| *B64D 27/10* | (2006.01) |
| *B64D 27/24* | (2006.01) |
| *H02K 7/116* | (2006.01) |
| *H02K 16/00* | (2006.01) |
| *H02K 7/18* | (2006.01) |
| *B64D 27/02* | (2006.01) |
| *H02K 7/14* | (2006.01) |

(52) U.S. Cl.
CPC .............. *F02C 7/36* (2013.01); *B64D 27/10* (2013.01); *B64D 27/24* (2013.01); *H02K 7/116* (2013.01); *H02K 16/00* (2013.01); *B64D 2027/026* (2013.01); *F05D 2220/76* (2013.01); *F05D 2260/40311* (2013.01); *H02K 7/14* (2013.01); *H02K 7/1823* (2013.01)

(58) Field of Classification Search
CPC .................................. F02C 7/36; B64D 27/10
See application file for complete search history.

(56) References Cited

U.S. PATENT DOCUMENTS

| | | | | |
|---|---|---|---|---|
| 4,487,034 | A * | 12/1984 | Cronin ................... | B64D 13/06 62/172 |
| 5,125,597 | A * | 6/1992 | Coffinberry ............. | B64C 21/00 244/118.5 |
| 7,179,186 | B2 * | 2/2007 | Bucknor ................ | B60K 6/365 475/280 |
| 7,645,206 | B2 * | 1/2010 | Holmes .................. | F16H 3/728 475/286 |
| 8,955,794 | B2 | 2/2015 | Mackin et al. | |
| 8,967,528 | B2 | 3/2015 | Mackin et al. | |
| 9,114,804 | B1 * | 8/2015 | Shukla .................. | B60W 20/10 |
| 2006/0260323 | A1 * | 11/2006 | Moulebhar ........... | F01D 21/003 60/793 |

(Continued)

*Primary Examiner* — Sean Gugger
(74) *Attorney, Agent, or Firm* — Vivacqua Law

(57) ABSTRACT

A hybrid drive system driven by a gas turbine engine is disclosed. The hybrid drive system includes a planetary gear set, a first motor-generator, and a second motor-generator. The planetary gear set includes a first member, a second member, and a third member. The first member is operatively coupled to the second member and the third member. The first member is operatively coupled to and transmits power from a shaft of the gas turbine engine. The first motor-generator is drivingly coupled to the third member. The second motor-generator includes an output and is drivingly coupled to the second motor-generator by the second member and the third member. The hybrid drive system is configured to transfer the power from the shaft to the output of the second motor-generator.

17 Claims, 6 Drawing Sheets

(56) References Cited

U.S. PATENT DOCUMENTS

| | | | |
|---|---|---|---|
| 2007/0151258 A1* | 7/2007 | Gaines | F02C 7/36 |
| | | | 60/792 |
| 2009/0064683 A1* | 3/2009 | Moniz | F02C 7/275 |
| | | | 60/792 |
| 2009/0074568 A1 | 3/2009 | Suciu et al. | |
| 2014/0288756 A1* | 9/2014 | Tanaka | B60K 6/34 |
| | | | 701/22 |
| 2015/0275758 A1 | 10/2015 | Foutch et al. | |
| 2015/0292578 A1* | 10/2015 | Anglin | G05G 5/24 |
| | | | 74/577 R |
| 2015/0345506 A1 | 12/2015 | Dorman et al. | |
| 2016/0061293 A1* | 3/2016 | Hwang | F03D 15/00 |
| | | | 477/36 |
| 2016/0288779 A1* | 10/2016 | Kotloski | F16H 3/728 |
| 2016/0288780 A1* | 10/2016 | Shukla | B60W 20/10 |
| 2017/0108085 A1* | 4/2017 | Morrow | B60K 6/365 |
| 2017/0166194 A1* | 6/2017 | Kumazaki | B60W 10/06 |
| 2017/0246947 A1* | 8/2017 | Kotloski | B60K 6/445 |
| 2017/0253229 A1* | 9/2017 | Shukla | B60W 20/10 |
| 2017/0363180 A1* | 12/2017 | Steinberger | B60K 6/365 |
| 2017/0370446 A1* | 12/2017 | Steinberger | B60K 6/365 |
| 2018/0072303 A1* | 3/2018 | Shukla | F16H 1/28 |

\* cited by examiner

HYBRID DRIVE SYSTEM FOR TRANSFERRING POWER FROM A GAS TURBINE ENGINE OF AN AIRCRAFT

FIELD

The disclosed system and method relate to an aircraft including a hybrid drive system for transferring power from a gas turbine engine to a device and, more particularly, to a hybrid drive system including a planetary gear set, a first motor-generator, and a second motor-generator.

BACKGROUND

An environmental control system, which is commonly referred to as an ECS, provides air supply, thermal control and cabin pressurization within an aircraft. Air is typically supplied to conventional ECS systems by bleed air extracted from a high pressure compressor of an aircraft engine. Specifically, the bleed air is usually extracted from a discharge or a low stage of the high pressure compressor of the aircraft engine. The bleed air is compressed or pressurized and heated to a relatively high temperature when compared to ambient conditions. Accordingly, the bleed air often needs to be cooled by a heat exchanger, which is also referred to as a pre-cooler, before being delivered to an ECS. The bleed air is cooled to a desired temperature and is then delivered to the ECS system. However, a substantial amount of energy may be spent by the aircraft engine in order to compress and cool the bleed air. Therefore, extracting bleed air from the aircraft engine may significantly reduce the engine's propulsive efficiency, which also results in an increase in the aircraft engine's Specific Fuel Consumption (SFC).

In one approach to reduce the amount of bleed air extracted from the aircraft engine, a compressor that receives ambient air from an atmospheric inlet may be provided. The compressor pressurizes the ambient air prior to being delivered to the ECS. However, this approach also has drawbacks, as the atmospheric inlet creates drag. Moreover, the atmospheric inlet may be susceptible to icing. Accordingly, the aircraft may be provided with an anti-icing system. However, the anti-icing system increases cost and system complexity of the aircraft.

SUMMARY

In one example, a hybrid drive system driven by a gas turbine engine is disclosed. The hybrid drive system includes a planetary gear set, a first motor-generator, and a second motor-generator. The planetary gear set includes a first member, a second member, and a third member. The first member is operatively coupled to the second member and the third member. The first member is operatively coupled to and transmits power from a shaft of the gas turbine engine. The first motor-generator is drivingly coupled to the third member. The second motor-generator includes an output and is drivingly coupled to the second motor-generator by the second member and the third member. The second motor-generator includes an output and is drivingly coupled to the second motor-generator by the second member and the third member. The hybrid drive system is configured to transfer the power from the shaft to the output of the second motor-generator.

In another example, an aircraft is disclosed. The aircraft includes a gas turbine engine including a shaft, a power takeoff shaft, a device, and a hybrid system. The power takeoff shaft extracts power from the shaft of the gas turbine engine. The device is configured to produce substantially constant power and substantially constant rotational speed when the aircraft operates at a high altitude transition point and during descent of the aircraft. The hybrid drive system includes a planetary gear set, a first motor-generator, and a second motor-generator. The planetary gear set includes a carrier, a ring gear, and a sun gear. The carrier is operatively coupled to the ring gear and the sun gear. The carrier is operatively coupled to the shaft of the gas turbine engine. The first motor-generator is drivingly coupled to the sun gear. The second motor-generator includes an output operatively coupled to the device. The first motor-generator is drivingly coupled to the second motor-generator by the ring gear and the sun gear. The second motor-generator includes an output and is drivingly coupled to the second motor-generator by the second member and the third member. The hybrid drive system is configured to transfer the power from the shaft into the substantially constant power and the substantially constant speed at the output when the gas turbine engine operates at a flight idle during the high altitude transition point and the descent of the aircraft.

In yet another example, a method for powering a device by a gas turbine engine during a high altitude transition point and during descent of an aircraft is disclosed. The method comprises extracting power from a shaft of the gas turbine engine by a power takeoff shaft. The power takeoff shaft is drivingly coupled to a carrier of a planetary gear set. The method includes driving a first motor-generator by a sun gear of the planetary gear set, wherein the carrier is operatively coupled to the sun gear. The method further includes coupling the first motor-generator to a second motor-generator by a ring gear and the sun gear. Finally, the method includes transferring substantially constant power and substantially constant speed from an output of the second motor-generator to a device when the gas turbine engine operates at a flight idle during the high altitude transition point and the descent of the aircraft.

Other objects and advantages of the disclosed method and system will be apparent from the following description, the accompanying drawings and the appended claims.

DETAILED DESCRIPTION

Figure 1:
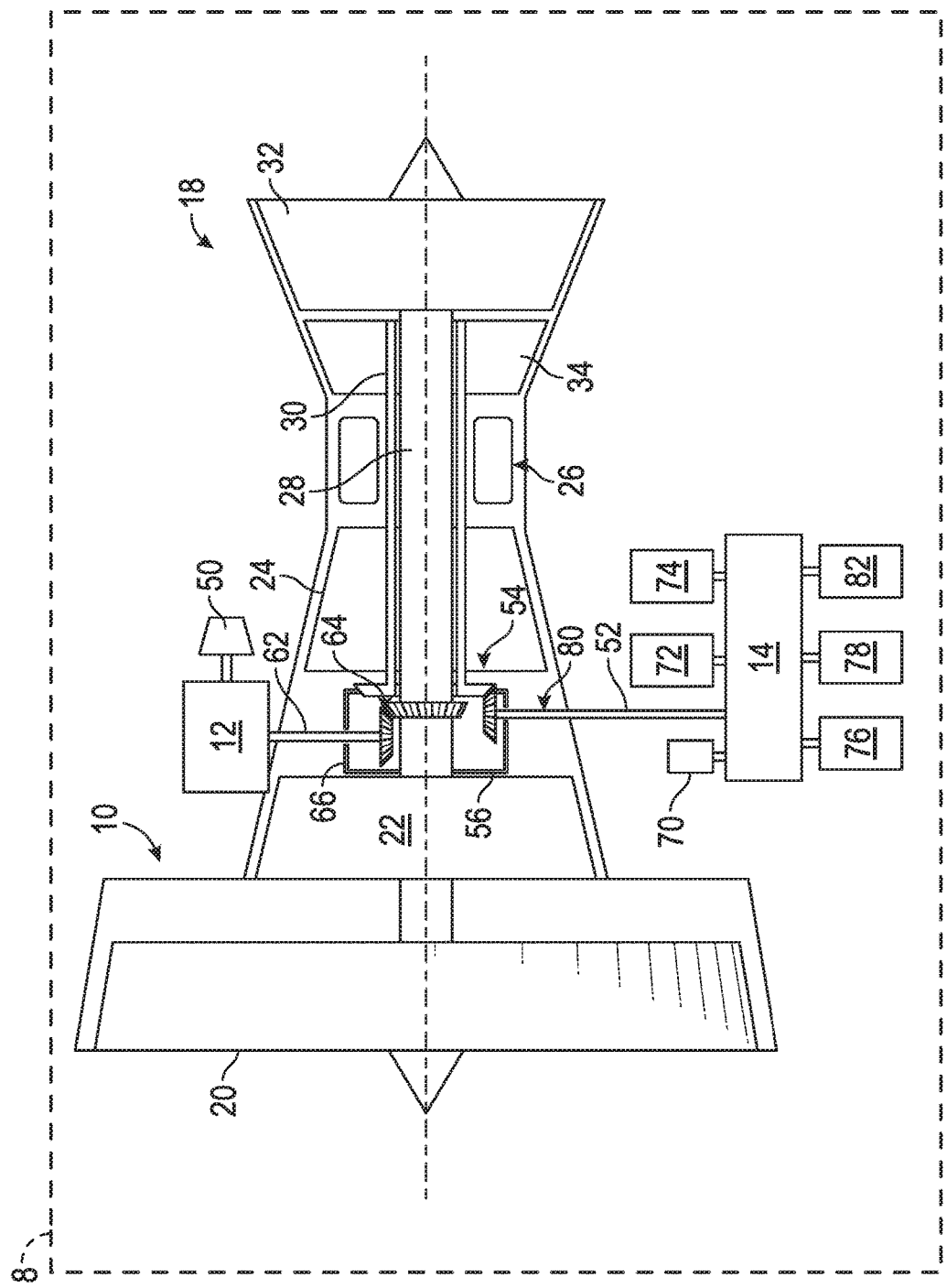
FIG. 1 is an exemplary schematic illustration of an aircraft including a gas turbine engine drivingly coupled to the disclosed hybrid drive system, where the hybrid drive system operatively couples the gas turbine engine to a device.

FIG. 1 is an exemplary schematic illustration of a turbofan engine 10 of an aircraft 8. The turbofan engine 10 includes an accessory gear box 14. A hybrid drive system 12 is operatively coupled to and is driven by the turbofan engine 10 of the aircraft 8. In the embodiment as illustrated, the turbofan engine 10 includes a gas turbine engine 18 and fan section 20 driven by the gas turbine engine 18. The gas turbine engine 18 includes a booster or low pressure compressor 22, a high pressure compressor 24, a combustion section 26, a low pressure shaft 28, a high pressure shaft 30, a low pressure turbine 32, and a high pressure turbine 34. The turbofan engine 10 is illustrated having a two-spool configuration where the fan 20, the low pressure compressor 22, and the low pressure turbine 32 are mounted on the low pressure shaft 28. The high pressure compressor 24 and the high pressure turbine 34 are mounted upon the high pressure shaft 30. Although FIG. 1 illustrates a two-spool configuration, the turbofan engine 10 may include other configurations as well. Specifically, the turbofan engine 10 may include a three-spool configuration, or two-spool configuration having a geared fan, which are described in greater detail below.

Figure 2:
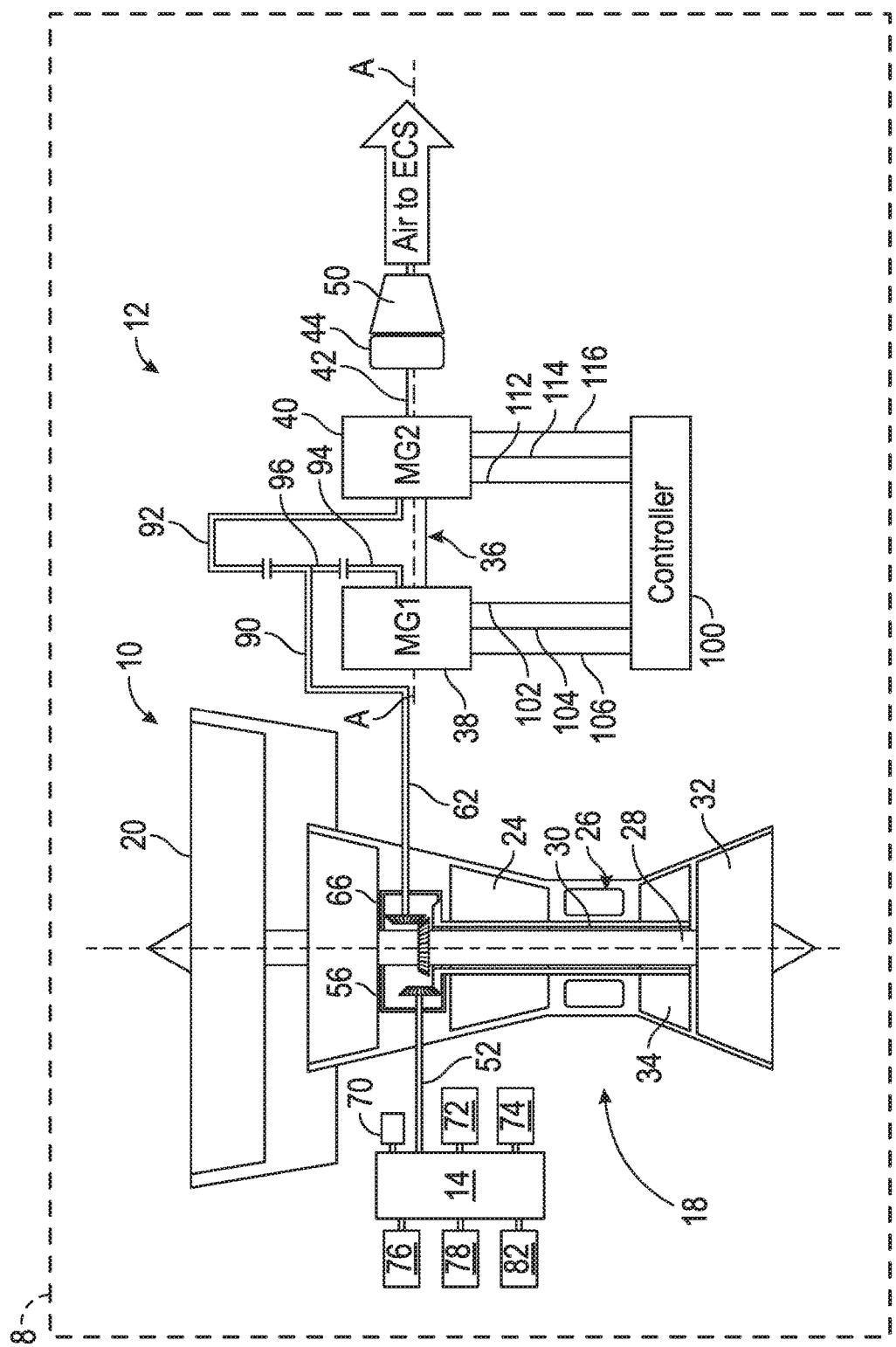
FIG. 2 is an exemplary illustration of the aircraft shown in FIG. 1, where a planetary gear set of the hybrid drive system is shown.

Turning now to FIG. 2, the hybrid drive system 12 includes a planetary gear set 36, a first motor-generator 38, and a second motor-generator 40. A shaft or output 42 of the second motor-generator 40 is drivingly coupled to a gear box 44. An output (not illustrated) of the gear box is drivingly coupled to an input of a device 50. Accordingly, the output 42 of the second motor-generator 40 is operatively coupled to the device 50. As seen in FIG. 2, the hybrid drive system 12 operatively couples the low pressure shaft 28 of the turbofan engine 10 to the device 50.

In one exemplary embodiment, the device 50 is a cabin air compressor (CAC) for providing the compressed air required by an environmental control system (ECS) of the aircraft 8. In another embodiment, the device 50 is either a constant frequency generator or a variable frequency generator. However, the device 50 may be any machine capable of producing variable power and speed during takeoff, climb, and cruise of the aircraft 8, and is configured to produce substantially constant power and substantially constant rotational speed when the aircraft operates at a high altitude transition point and during descent of the aircraft 8. The high altitude transition point represents the altitude at which the aircraft 8 transitions from cruise to descent, and the turbofan engine 10 is throttled back (i.e., the speed and power are reduced) to flight idle. The high altitude transition point varies based on the particular type or model of aircraft. For example, in one embodiment the high altitude transition point of the aircraft 8 is about 38,000 feet (11,582.4 meters). Flight idle represents the rotational speed of the low pressure shaft 28 and the high pressure shaft 30 when the aircraft 8 is in flight at a given altitude, with the throttle set to a minimum, or idle, position.

Referring back to FIG. 1, the low pressure shaft 28 is disposed within and is concentric with the high pressure shaft 30 of the turbofan engine 10. In the embodiment as shown in FIG. 1, a power takeoff shaft 52 drivingly couples the accessory gear box 14 to the high pressure shaft 30 of the turbofan engine 10 by a gear box 56. The gear box 56 includes a set of bevel gears 54. A power takeoff shaft 62 drivingly couples the hybrid drive system 12 to the low pressure shaft 28 by a gear box 66. The gear box 66 includes a set of bevel gears 64.

In the embodiment as shown, the power takeoff shaft 62 drivingly couples to and extracts power from the low pressure shaft 28 of the turbofan engine 10. Specifically, the power takeoff shaft 62 extracts power from the low pressure shaft 28 at a location downstream of the fan 20 and the low pressure compressor 22, and upstream of the high pressure compressor 24. In another embodiment, the turbofan engine 10 may include a two-spool geared fan configuration, where the power takeoff shaft 62 extracts power from the low pressure shaft 28 either upstream or downstream of a geared fan (not illustrated).

In the two-spool configuration as shown in FIGS. 1-2, the fan 20, the low pressure compressor 22, and the low pressure turbine 32 are mounted upon the low pressure shaft, and the low pressure turbine 32 drives the low pressure compressor 22 and the fan 20 via the low pressure shaft 28. The high pressure compressor 24 and the high pressure turbine 34 are mounted upon the high pressure shaft 30, and the high pressure turbine 34 drives the high pressure compressor 24 via the high pressure shaft 30. Furthermore, it is to be appreciated that the fan 20 is typically significantly larger in diameter when compared to the low pressure compressor 22 and the low pressure turbine 32. Accordingly, either the fan 20 needs to be rotating much faster than its' corresponding optimal speed or, alternatively, the low pressure compressor 22 and the low pressure turbine 32 need to rotate at a speed that is slower than their corresponding optimal speed. Since the rotational speed of the low pressure shaft 28 is typically limited to an optimal fan blade tip speed of the fan 20, the low-pressure compressor 22 and the low pressure turbine 32 usually rotate at a speed lower than their own corresponding optimal speeds. Accordingly, the power transmitted to the device 50 from the turbofan engine 10 is limited by the fan 20.

In yet another embodiment, the turbofan engine 10 includes a three-spool configuration where the power takeoff shaft 62 extracts power from either a low pressure shaft or an intermediate shaft (i.e., the shaft located outside of the low pressure shaft and within a high pressure shaft). In the event a three-spool configuration is used, the low pressure compressor 22 and the low pressure turbine 32 are now designated as an intermediate-pressure compressor and turbine, and the fan 20 is now driven by a low pressure shaft. This way, both the fan and the intermediate pressure compressor and turbine may rotate at their corresponding optimal speeds. However, similar to the two-spool configuration, the low pressure shaft still rotates at a relatively slow speed.

Continuing to refer to FIG. 1, one of the bevel gears 54 of the gear box 56 may be disposed on first or distal end 80 of the power takeoff shaft 52, which drivingly couples the high pressure shaft 30 to the accessory gear box 14. The accessory gear box 14 is part of the gas turbine engine 18, and drives various accessories required for the operation of the gas turbine engine 18 and/or the aircraft 8. In the exemplary embodiment as shown, the accessories driven by the accessory gear box 14 include a permanent magnet generator 70, a lubrication oil pump 72, a fuel pump 74, a constant frequency generator 76, a starter 78, and a hydraulic pump 82. The accessory gear box 14 includes a plurality of gears (not illustrated) that drive the various accessories 72, 74, 76, 78, 82.

Turning to FIG. 2, the planetary gear set 36 includes a first member, a second member, and a third member, where the first member is a carrier 90, the second member is a ring gear 92, and the third member is a sun gear 94. FIG. 2 is a simplified, schematic half-view of the planetary gear set 36 illustrated as a stick-diagram, which is taken along a main axis A-A of the planetary gear set 36. The carrier 90 rotatably supports a plurality of planetary gears (or pinions) 96 that are disposed in meshing relationship with both the sun gear 94 and the ring gear 92. Accordingly, the carrier 90 is operatively coupled to the ring gear 92 and the sun gear 94 via the planetary gears 96. The carrier 90 is operatively coupled to and transmits power from either a low or an intermediate shaft of the turbofan engine 10. In the embodiment as shown in FIG. 2, the carrier 90 is operatively coupled to the low pressure shaft 28 via the power takeoff shaft 62. However, if the turbofan engine 10 includes a three-spool configuration, then the carrier 90 may be operatively coupled to either the low pressure shaft or the intermediate shaft. The ring gear 92 is drivingly coupled to the second motor-generator 40. The sun gear 94 is drivingly coupled to the first motor-generator 38.

As explained in greater detail below, the sizing of the motor-generators 38, 40 may be based on the operating conditions at flight idle. For example, assuming a relatively high efficiency of the planetary gear set 36 (e.g., about 96%) and the motor-generators 38, 40 (e.g., about 95%), the motor-generators 38, 40 are rated about 240 horsepower (179 kW). In one specific embodiment, the motor-generators 38, 40 may be variable frequency starter generators that are capable of operating up to about 14,000 RPM.

Both the first and second motor-generators 38, 40 are in communication with a controller 100. The controller 100 may refer to, or be part of, an application specific integrated circuit (ASIC), an electronic circuit, a combinational logic circuit, a field programmable gate array (FPGA), a processor (shared, dedicated, or group) comprising hardware or software that executes code, or a combination of some or all of the above, such as in a system-on-chip. The controller 100 is in communication with the first motor-generator 38 and the second motor-generator 40, and controls a rotational speed and a direction of both the first motor-generator 38 and the second motor-generator 40. In one exemplary embodiment the controller 100 is a common motor start controller (CMSC), which means that the controller 100 is configured to control a start function and properly regulates torque during a start sequence. Furthermore, the controller 100 may generate sufficient heat to require a cooler (not illustrated). The cooler may be, for example, an oil cooler.

In the embodiment as illustrated, the controller 100 is a three-phase controller and the motor-generators 38, 40 operate based on three-phase alternating current (AC) power. Accordingly, the controller 100 is in communication with the first motor-generator 38 by three respective phase inputs 102, 104, 106. The controller 100 is also is in communication with the second motor-generator 40 by three phase inputs 112, 114, 116. It is to be appreciated that three-phase control systems typically use less conductor material to transmit a given amount of electrical power when compared to single-phase systems. Furthermore, in one embodiment the motor-generators 38, 40 and the controller 100 may both be mounted within a fan case (not illustrated) of the aircraft 8, which also reduces the amount of conductor material required. Although a three-phase system is described, in another embodiment a hydraulic pump and motor set may be used as well. However, if a hydraulic pump and motor are utilized, then additional gearing may be required.

Continuing to refer to FIG. 2, the output 42 of the second motor-generator 40 is drivingly coupled to the gear box 44. Therefore, the rotational power extracted from the low pressure shaft 28 of the turbofan engine 10 is transmitted to the second motor-generator 40, and is used to rotatably drive the gear box 44. In one non-limiting embodiment, the gear box 44 provides a speed increase at a 2:1 ratio. The gear box 44 may be drivingly coupled to the device 50. Accordingly, output 42 of the second motor-generator 40 is operatively coupled to the device 50. In another approach the gear box 44 may be omitted, and the output 42 of the second motor-generator 40 is directly coupled to the device 50.

Operation of the turbofan engine 10 and the hybrid drive system 12 to provide power to the device 50 during the various phases of flight will now be explained. Specifically, operation during takeoff, climb, and cruise will first be described. During these phases of flight, the low pressure shaft 28 rotates at a given speed. Moreover, both the ring gear 92 and the sun gear 94 include a given number of teeth. The number of teeth may be based on the number of pinion members 96 as well as the speed of the carrier 90, the ring gear 92, and the sun gear 94. In one illustrative embodiment, it is assumed the rotational speed of the low pressure shaft 28 is about 9,000 RPM, the device 50 requires about 255 horsepower (about 190 kilowatts) at about 20,000 RPM, the ring gear 92 includes 88 teeth, and the sun gear 94 includes 40 teeth. Although specific rotational speeds, gear ratios, and number of teeth are described, those of ordinary skill in the art will readily appreciate that these values are merely exemplary in nature and a variety of other values may be used as well.

Since the ring gear 92 drives the device 50, the ring gear 92 is also driven at 255 horsepower. Accordingly, the torque of the ring gear 92 is 133.9 lb/in (18.5 kg/m). The torque of the ring gear 92 may be calculated using Equation 1:

$$\left(\frac{5252}{RPM}\right) \text{Horsepower} = \text{Torque} \qquad \text{Equation 1}$$

The torque of the carrier 90, which is about 194.8 lb/in (26.9 kg/m) may be determined using Equation 2, and the torque of the sun gear 94, which is about 60.9 lb/in (8.4 kg/m), may be determined using Equation 3:

$$T_C = \frac{R+S}{R} T_R \qquad \text{Equation 2}$$

$$T_S = \frac{S}{R+S} T_C \qquad \text{Equation 3}$$

where R is the number of teeth included by the ring gear 92, S is the number of teeth included by sun gear 94, $T_C$ is the torque of the carrier 90, $T_R$ is the torque of the ring gear 92, and $T_S$ is the torque of the sun gear 94.

In one non-limiting embodiment, the gear box 66 drivingly couples the low pressure shaft 28 to the power takeoff shaft 62 and includes a 1:1 gear ratio. However, other gear ratios may be used as well by the gear box 66. Since the carrier 90 is drivingly coupled to the turbofan engine 10 by the power takeoff shaft 62 at a 1:1 gear ratio, the carrier 90 also includes a rotational speed of about 9,000 RPM. Accordingly, the carrier 90 needs to transmit about 333.8 horsepower (248.3 kW) from the turbofan engine 10, which is determined based on Equation 1. Finally, the rotational speed of the sun gear 94 is about 6,800 RPM. Therefore, the sun gear 94 includes about 78.8 horsepower (58.7 kW), which is also determined based on Equation 1. Thus, the hybrid drive system 12 has a power split where a majority of the power is transmitted to the ring gear 92. More specifically, in the present embodiment the 255 horsepower generated by the turbofan engine 10 is transmitted to the ring gear 92. The remaining power, which is about 78.8 horsepower (i.e., 333.8−255=78.8 horsepower), is transmitted to the sun gear 94.

As seen in FIG. 2, the first motor-generator 38 is drivingly coupled to the second motor-generator 40 by the ring gear 92 and the sun gear 94. Since there is additional shaft power at the first motor-generator 38 (e.g., about 78.8 horsepower), the first motor-generator 38 may be used to drive the second motor-generator 40. In other words, if there is additional shaft power at the first motor-generator 38 during takeoff, climb, or cruise, then the first motor-generator 38 operates as a generator to transfer the additional shaft power to the second motor-generator 40. If the additional shaft power from the first motor-generator 38 is used to drive the second motor-generator 40, then the carrier 90 only needs to transmit 255 horsepower. Accordingly, using Equation 1 above, the torque of the carrier 90 is about 148.8 lb/in (20.6 kg/m). Using Equation 3 above, the torque of the sun gear 94 is calculated to be about 46.5 lb/in (6.4 kg/m). Using Equation 2 above, the torque of the ring gear 92 is calculated to be about 102.3 lb/in (14.1 kg/m). Using Equation 1 above, the sun gear 94 operates at about 60.2 horsepower (48.2 kW), and the ring gear 92 operates at about 194.8 horsepower (145.8 kW). The power supplied to the second motor-generator 40 is about 60.2 horsepower, and the power being extracted from the first motor-generator 40 is about 60.2 horsepower.

In the present example, it is assumed that the hybrid drive system 12 and both the first motor-generator 38 and the second motor-generator 40 have no loss of energy. At higher power settings such as takeoff, climb, and a majority of cruise, the first and second motor-generators 38, 40 are generally used less. Accordingly, the mechanical efficiency of the hybrid drive system 12 tends to be relatively high. However, during descent of the aircraft 8, the motor-generators 38, 40 tend to be used more, which thereby reduces the mechanical efficiency of the hybrid system 12.

The hybrid drive system 12 is configured to transfer power from the low pressure shaft 28 into substantially constant power and substantially constant speed at the output 42 of the second motor-generator 40 when the turbofan engine 10 operates at flight idle during the high altitude transition point and during descent of the aircraft 8. Operation of the hybrid drive system 12 during the high altitude transition point and descent will now be explained. When the aircraft 8 reaches the high altitude transition point, the turbofan engine 10 is throttled back to flight idle. In the exemplary embodiment as described, the low pressure shaft 28 rotates at about 3750 RPM and generates about 622 horsepower (463.8 kW) during the high altitude transition point and descent. Accordingly, the low pressure shaft 28 of the turbofan engine 10 generates a sufficient amount of power required by the device 50 during flight idle (which is about 255 horsepower in the present example). However, rotational speed of the low pressure shaft 28 is insufficient for operation of the device 50, since the device 50 requires 255 horsepower at about 10,000 RPM. Therefore, as explained below, the second motor-generator 40 operates as a generator to transmit excess shaft power through the ring gear 92 and the sun gear 94 of the planetary gear set 36 to the first motor-generator 38 during the high altitude transition point and descent of the aircraft 8. The first motor-generator 38 operates as a motor when the aircraft 8 operates at the high altitude transition point and descent.

In the present example, during the high altitude transition point and descent the device 50 is required to operate at about 255 horsepower at about 10,000 RPM. Accordingly, the ring gear 92 is driven at about 255 horsepower at about 133.9 lb/in (18.5 kg/m) of torque. The torque of the carrier 90 remains at about 194.8 lb/in, and the torque of the sun gear 94 remains at about 60.9 lb/in. However, in the present example the low pressure shaft 28 is now operating at a much lower rotational speed (about 3750 RPM) when compared to the rotational speed during takeoff, climb, and cruise of the aircraft 8. Therefore, the carrier 90 generates about 139.1 horsepower (103.7 kW), which is calculated using Equation 1 above. The lack of power from the low pressure shaft 28 creates a power deficit at the sun gear 94, which in turn creates a power deficit at the motor-generator 38.

In order to compensate for the power deficit at the first motor-generator 38, the second motor-generator 40 is utilized to provide the additional shaft power required by the first motor-generator 38. Specifically, the second motor-generator 40 operates as a generator to transfer additional shaft power to the first motor-generator 38 during the high altitude transition point and descent of the aircraft 8. Accordingly, new values for torque and horsepower of the carrier 90, the ring gear 92, and the sun gear 94 are determined. First, the power of the carrier 90 is set to about 255 horsepower, and using Equation 1 above the torque of the carrier 90 is calculated as about 357.1 lb/in (49.4 kg/m). Using Equation 2, the ring gear 92 is calculated as having about 245.5 lb/in (33.9 kg/m) of torque and about 467.5 horsepower (348.6 kW). Accordingly, there is excess shaft power at the ring gear 92 and the second motor-generator 40.

The excess shaft power at the second motor-generator 40 is used to drive the first motor-generator 38. Specifically, the second motor-generator 40 is generating an additional 212.5 horsepower than what is required by the device 50 (i.e., 467.5−255=212.5 horsepower). The excess horsepower is provided to the first motor-generator 38 via a connection between the first motor-generator 38 and the second motor-generator 40. As seen in FIG. 2, the ring gear 92 and the sun gear 94 couple the first motor-generator 38 to the second motor-generator 40. Accordingly, the torque at the sun gear 94 is about 111.6 lb/in (15.4 kg/m) and is determined using Equation 1 above.

In the present example, the motor-generators 38, 40 and the planetary gear set 36 are assumed to operate at 100% efficiency. However, as explained above, during descent the motor-generators 38, 40 are used more, which thereby reduces the mechanical efficiency. In one example, the planetary gear set 36 may operate at about 96% efficiency, and the first and second motor-generators 38, 40 operate at about 95% efficiency. In this example, the second motor-generator 40 will require more power due to energy losses. Specifically, the second motor-generator 40 needs to generate an additional 233.9 horsepower (174.4 kW) than what is required by the device 50. Accordingly, in this example both motor-generators 38, 40 may be rated at about 240 horsepower. In another example, the planetary gear set 36 may operate at about 85% efficiency and the first and second motor-generators 38, 40 operate at about 85% efficiency. In this example, the second motor-generator 40 needs to generate an additional 293.1 horsepower (218.5 kW). Accordingly, the motor-generators 38, 40 may be rated at about 300 horsepower (223.7 kW).

Figure 3:
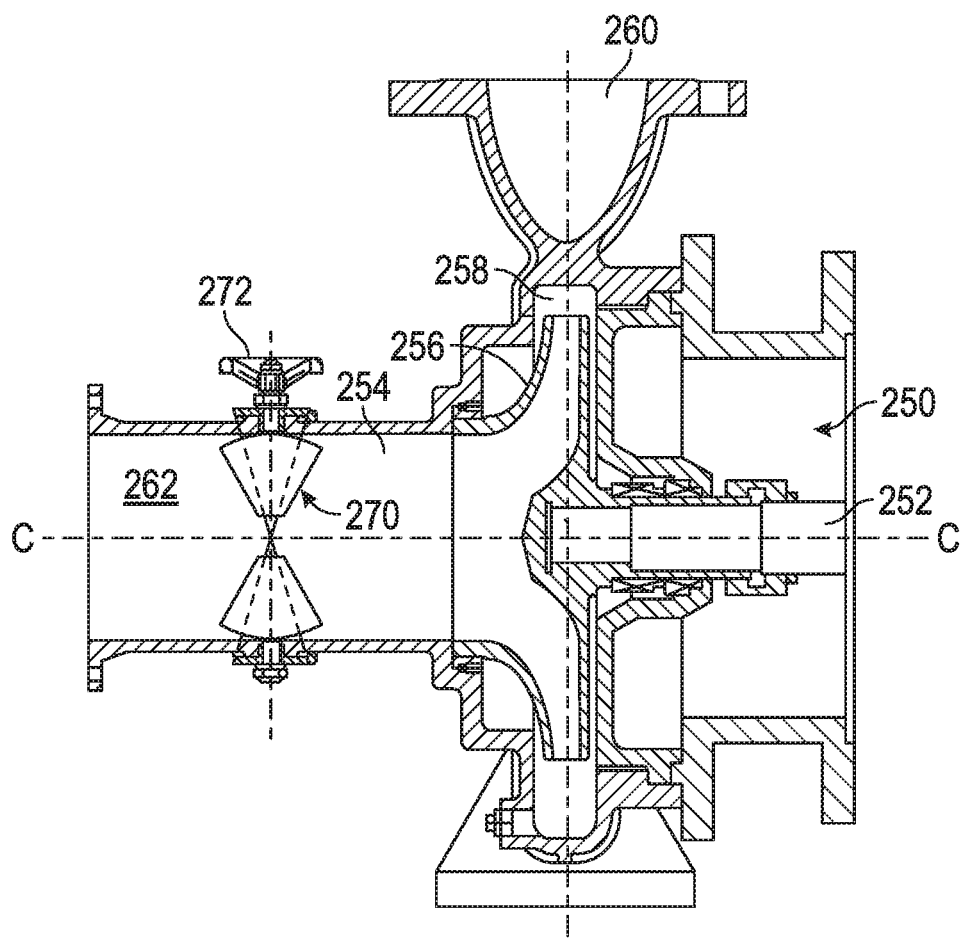
FIG. 3 is a cross-section of an exemplary cabin air compressor (CAC) and variable guide inlet vanes positioned upstream of an impeller of the CAC.

As mentioned above, in one embodiment the device 50 is a CAC providing the compressed air required by the ECS (not illustrated). Turning now to FIG. 3, an exemplary CAC 250 is illustrated. The CAC 250 may include a shaft 252 disposed along a centerline C-C of the CAC 250, an air inlet 254, an impeller 256, an air outlet 258, and a volute 260. Air travels through a suction pipe 262 and into the air inlet 254. The impeller 256 draws air into the CAC 250. Air is then passed through the air outlet 258. A plurality of inlet guide vanes 270 may be positioned within the suction pipe 262 upstream of the impeller 256. In the embodiment as shown, the inlet guide vanes 270 are variable inlet guide vanes that include variable geometry. One or more actuators 272, such as a hydraulic actuator or an electric motor, may be located outside of the suction pipe 262, and are operatively connected to the variable inlet guide vanes 270. The actuators 272 are used to rotate or twist the variable inlet guide vanes 270 into a fixed position. Twisting or rotating the variable inlet guide vanes 270 may impart a swirl to air traveling within the suction pipe 262 and changes an angle of attack that the air travels along relative to the impeller 256 of the CAC 250.

Figure 4:
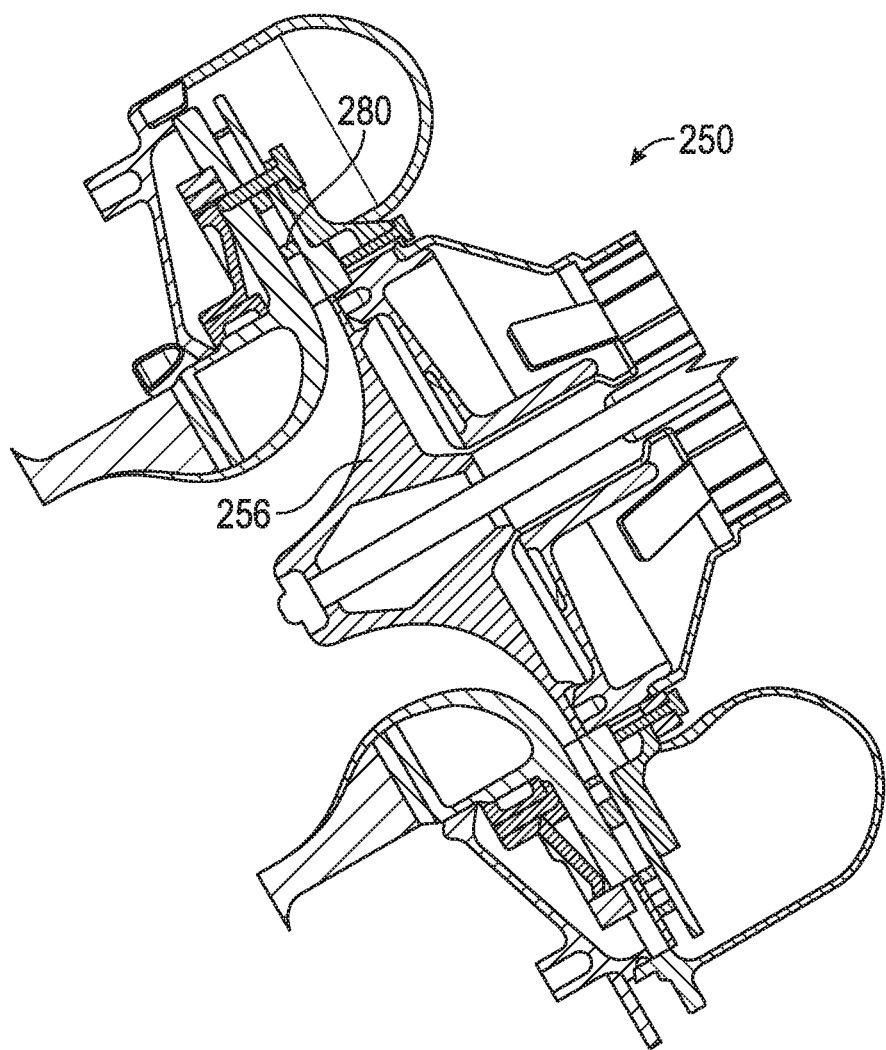
FIG. 4 is an illustration of the CAC shown in FIG. 3 having a variable diffuser positioned downstream of the impeller.

In the event the guide vanes 270 do not include variable geometry, then the CAC 250 may include a variable diffuser instead. That is, the CAC 250 includes either variable inlet guide vanes 270 located upstream of the impeller 256 or a variable diffuser 280 located downstream of the impeller 256 (which is illustrated in FIG. 4). Turning now to FIG. 4, the variable diffuser 280 is positioned downstream of the impeller 256 of the CAC 250. In contrast, the variable inlet guide vanes 270 shown in FIG. 3 are positioned upstream of the impeller 256 of the CAC 250.

Figure 5:
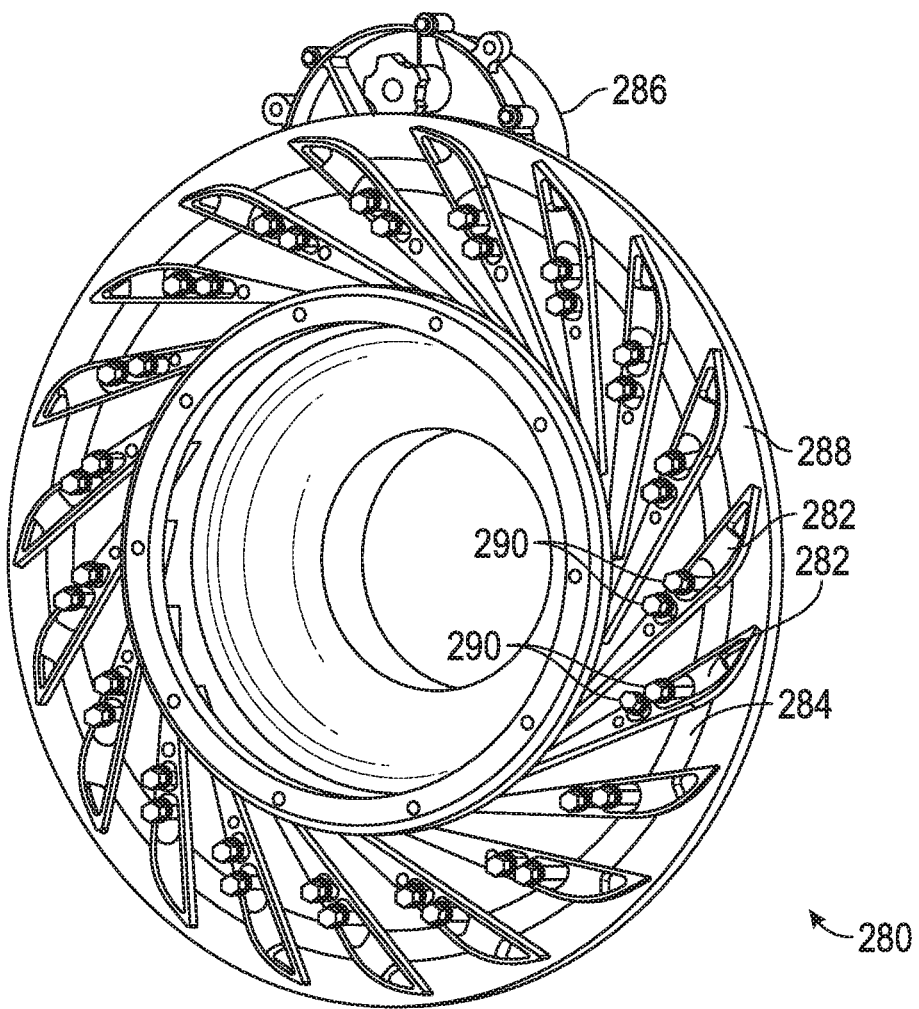
FIG. 5 is a perspective view of the variable diffuser shown in FIG. 4.

FIG. 5 is a perspective view of the variable diffuser 280. As seen in FIG. 5, the diffuser includes a plurality of vanes 282. Each of the vanes 282 may be rotatable, and a cross-sectional area of each vane 282 relative to the flow of air may change depending upon the specific orientation of the vane 282. The cross-sectional area of the vane 282 restrict or opens the connection between the air inlet 254 and the air outlet 258 (FIG. 3), which thereby controls the volume of air flowing through the CAC 250. Each vane 282 may be connected to a drive ring 284. The variable diffuser 280 includes an actuator 286 and a housing 288. The vanes 282 may twist about a corresponding set of fixed pins 290. The pins 290 may be attached to the housing 288 of the variable diffuser 280.

Figure 6:
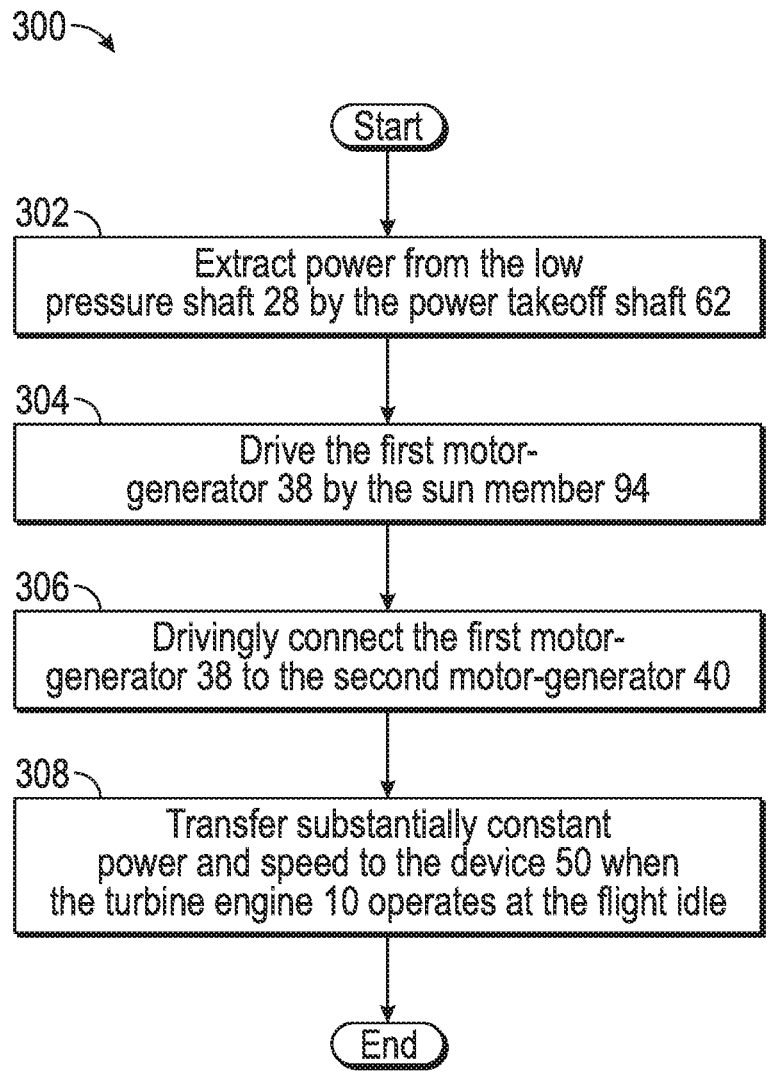
FIG. 6 is an exemplary process flow diagram illustrating a method for powering the device using the hybrid drive system during a high altitude transition point and descent of the aircraft.

FIG. 6 is a process flow diagram illustrating an exemplary method 300 for powering the device 50 by the turbofan engine 10. Referring generally to FIGS. 1-2 and 6, the method 300 begins at block 302. In block 302, the method 300 includes extracting power from the low pressure shaft 28 of the turbofan engine 10 by the power takeoff shaft 62. As mentioned above, the power takeoff shaft 62 is drivingly coupled to the carrier 90 of the planetary gear set 36. The method 300 may then proceed to block 304.

In block 304, the method 300 includes driving the first motor-generator 38 by the sun gear 94 of the planetary gear set 36. As seen in FIG. 2, the carrier 90 is drivingly coupled to the low pressure shaft 28, and is also operatively coupled to the sun gear 94. Method 300 may then proceed to block 306.

In block 306, the method includes coupling the first motor-generator 38 to the second motor-generator 40 by the ring gear 92 and the sun gear 94 of the planetary gear set 36. The method 300 may then proceed to block 308.

In block 308, the method includes transferring substantially constant power and substantially constant speed from the output 42 of the second motor-generator 40 to the device 50 when the turbofan engine 10 operates at the flight idle during the high altitude transition point and during descent of the aircraft 8. Method 300 may then terminate.

Referring generally to the figures, the disclosed hybrid drive system provides an efficient and relatively lightweight approach for providing substantially constant power and substantially constant speed as the aircraft operates at the high altitude transition point and descent. Specifically, the disclosed second motor-generator provides additional shaft power to the first motor-generator when the aircraft reaches the high altitude point and continues into descent. In one embodiment, the disclosed hybrid drive system may utilize motor-generators that are already in production and currently used for different systems within an aircraft. Thus, there may be reduced development costs associated with implementing the motor-generator for the disclosed application. Furthermore, the motor-generators may be significantly smaller and lighter when compared to a variable frequency starter generator. The planetary gear set may provide enhanced reliability when compared to some continuously variable transmissions (CVTs). This is because the planetary gear set does not require traction oil, thereby resulting in reduced weight when compared to a CVT.

In addition to the above-mentioned advantages, the motor-generators may also provide electrical power to various systems of the aircraft such as, for example, galley ovens, windshield heaters, and anti-icing systems. In fact, the disclosed motor-generators may be used to provide power to any device that is not dependent upon frequency. Furthermore, power from the motor-generators may be diverted to other systems in the aircraft for a relatively short period of time, such as during an emergency situation. Furthermore, the motor-generators may be used to spin the low pressure shaft when the aircraft is in taxi and the turbine engines are not operating. Spinning the low pressure shaft during taxi may mitigate rotor bow, which is also referred to as thermal bowing. Rotor bow normally occurs if the low pressure shaft experiences asymmetrical cooling after shutdown. Finally, the low pressure shaft may also operate as a turbine to drive the second motor-generator during emergency situations, which may eliminate the need to include a ram air turbine within the aircraft. Eliminating the ram air turbine typically results in significant weight savings for the aircraft.

While the forms of apparatus and methods herein described constitute preferred examples of this invention, it is to be understood that the invention is not limited to these precise forms of apparatus and methods, and the changes may be made therein without departing from the scope of the invention.

What is claimed is:

1. A hybrid drive system for providing power to a device and driven by a gas turbine engine of an aircraft, the hybrid drive system comprising:
   a planetary gear set including a first member, a second member, and a third member, the first member operatively coupled to the second member and the third member, and wherein the first member is operatively coupled to and transmits power from a shaft of the gas turbine engine;
   a first motor-generator drivingly coupled to the third member; and
   a second motor-generator including an output, the first motor-generator drivingly coupled to the second motor-generator by the second member and the third member, wherein the hybrid drive system is configured to transfer the power from the shaft to the output of the second motor-generator and the second motor-generator transfers additional shaft power to the first motor-generator during a high altitude transition point and a descent of the aircraft, and wherein the first motor-generator transfers additional shaft power to the second motor-generator during takeoff, climb, or cruise of the aircraft.

2. The hybrid drive system of claim 1, comprising a controller in communication with the first motor-generator and the second motor-generator, wherein the controller is configured to control a rotational speed and a direction of both the first motor-generator and the second motor-generator.

3. The hybrid drive system of claim 1, wherein the first member is a carrier, the second member is a ring gear, and the third member is a sun gear.

4. The hybrid drive system of claim 1, wherein the hybrid drive system is configured to transfer the power from the shaft into substantially constant power and substantially constant speed at the output of the second motor-generator when the gas turbine engine operates at a flight idle during a high altitude transition point and during descent of the aircraft.

5. The hybrid drive system of claim 1, wherein the shaft is either a low pressure shaft or an intermediate shaft and the gas turbine engine includes a three-spool configuration.

6. The hybrid drive system of claim 1, wherein the device is a cabin air compressor (CAC) including an input drivingly coupled to a gearbox, and wherein the output of the second motor-generator is drivingly coupled to the gearbox.

7. An aircraft, comprising:
a gas turbine engine including a shaft;
a power takeoff shaft that extracts power from the shaft of the gas turbine engine;
a device configured to produce substantially constant power and substantially constant rotational speed when the aircraft operates at a high altitude transition point and during descent of the aircraft; and
a hybrid drive system, comprising:
a planetary gear set including a carrier, a ring gear, and a sun gear, the carrier operatively coupled to the ring gear and the sun gear, and wherein the carrier is operatively coupled to the shaft of the gas turbine engine;
a first motor-generator drivingly coupled to the sun gear; and
a second motor-generator including an output operatively coupled to the device, the first motor-generator drivingly coupled to the second motor-generator by the ring gear and the sun gear, wherein the hybrid drive system is configured to transfer the power from the shaft into the substantially constant power and the substantially constant speed at the output of the second motor-generator when the gas turbine engine operates at a flight idle during the high altitude transition point and the descent of the aircraft and the second motor-generator transfers additional shaft power to the first motor-generator during a high altitude transition point and a descent of the aircraft, and wherein the first motor-generator transfers additional shaft power to the second motor-generator during takeoff, climb, or cruise of the aircraft.

8. The aircraft of claim 7, comprising a controller in communication with the first motor-generator and the second motor-generator, wherein the controller is configured to control a rotational speed and a direction of both the first motor-generator and the second motor-generator.

9. The aircraft of claim 7, comprising a gear box that drivingly couples a low pressure shaft to the power takeoff shaft.

10. The aircraft of claim 7, wherein the gas turbine engine includes a two-spool configuration and the shaft is a low pressure shaft.

11. The aircraft of claim 7, wherein the gas turbine engine includes a three-spool configuration and the shaft is either a low pressure shaft or an intermediate shaft.

12. The aircraft of claim 7, wherein the device is a cabin air compressor (CAC) having an impeller.

13. The aircraft of claim 12, wherein the CAC includes either variable inlet guide vanes located upstream of the impeller or a variable diffuser located downstream of the impeller.

14. The aircraft of claim 7, wherein the device is either a constant frequency generator or a variable frequency generator.

15. The aircraft of claim 7, wherein the device is a cabin air compressor (CAC) including an input driving coupled to a gearbox, and wherein the output of the second motor-generator is drivingly coupled to the gearbox.

16. A method for powering a device by a gas turbine engine during a high altitude transition point and during descent of an aircraft, the method comprising:
extracting power from a shaft of the gas turbine engine by a power takeoff shaft, wherein the power takeoff shaft is drivingly coupled to a carrier of a planetary gear set;
driving a first motor-generator by a sun gear of the planetary gear set, wherein the carrier is operatively coupled to the sun gear;
coupling the first motor-generator to a second motor-generator by a ring gear and the sun gear; transferring substantially constant power and substantially constant speed from an output of the second motor-generator to a device when the gas turbine engine operates at a flight idle during the high altitude transition point and the descent of the aircraft;
transferring additional shaft power from the second motor-generator to the first motor-generator during the high altitude transition point and the descent of the aircraft;
and operating the first motor-generator to transfer additional shaft power to the second motor-generator during takeoff, climb, or cruise of the aircraft.

17. The method of claim 16, wherein the device is a cabin air compressor (CAC) including an input, and wherein the method further comprises:
drivingly coupling the output of the second motor-generator to a gearbox; and
drivingly coupling the gearbox to the input of the CAC.

* * * * *